Patented Feb. 19, 1946

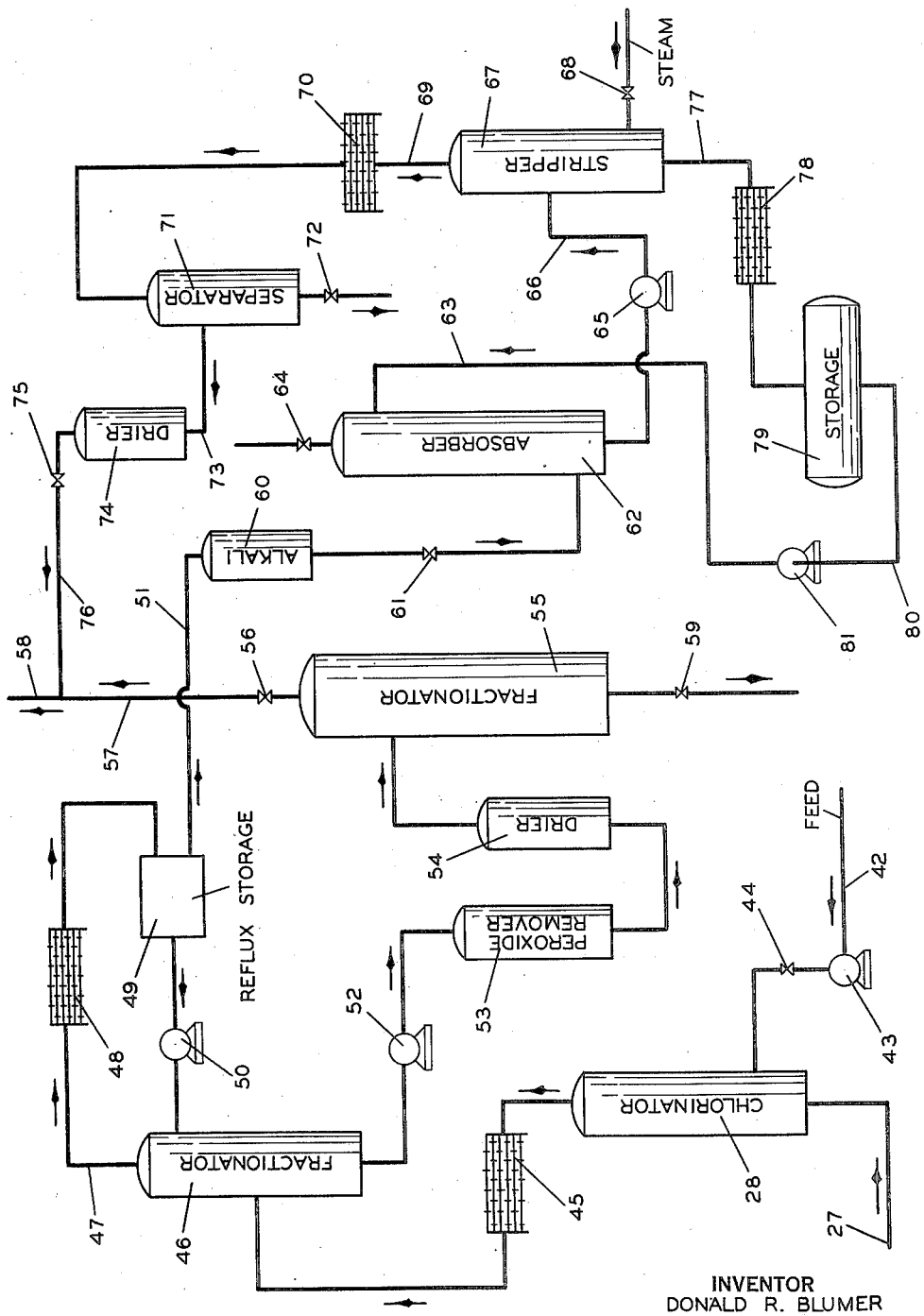

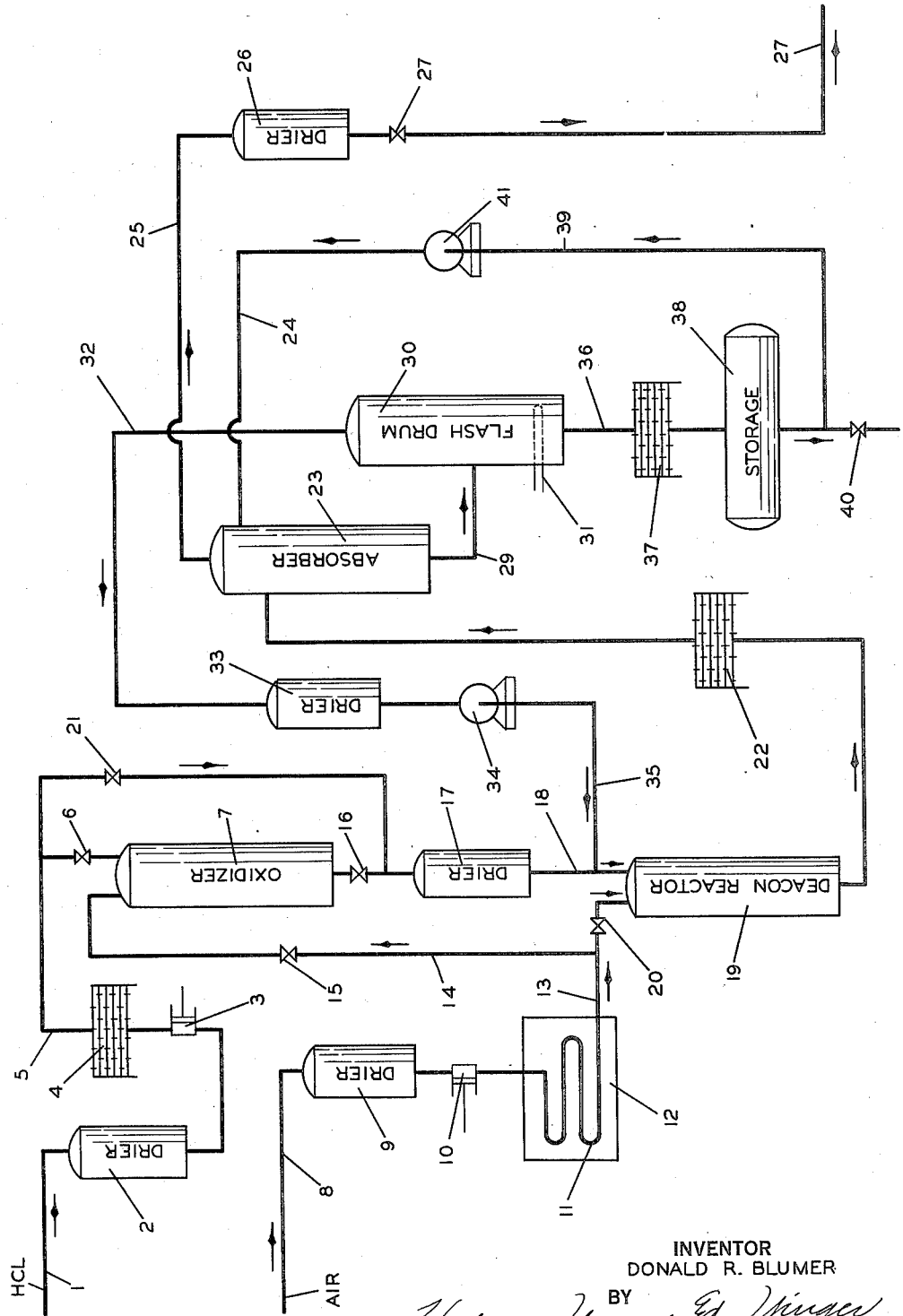

2,395,314

UNITED STATES PATENT OFFICE 2,395,314

PROCESS FOR THE PRODUCTION OF CHLORINE

Donald R. Blumer, Bartlesville, Okla., assignor to Phillips Petroleum Company, a corporation of Delaware Application February 12, 1942, Serial No. 430,670

10 Claims. (Cl. 23—219)

This invention relates to new and useful improvements in processes for producing a free halogen from a hydrogen halide and the utilization of the halogen produced for halogenation reactions. More particularly, it refers to improvements in the Deacon process for catalytic oxidation of a hydrogen halide to a free halogen and utilization of the free halogen in the effluent.

In the past, a halogen has been generated from hydrogen halide by oxidation processes using such oxidizing agents as manganese dioxide, manganese sesquioxide, potassium permanganate, chlorates, nitric acid, chromates, dichromates, and bleaching powder; by formation of metal halides followed by oxidation of the halides formed; by continuous catalytic oxidation processes with the use of air or free oxygen as oxidizing agent as in the Deacon process; and by electrolytic processes. Of the processes using inorganic oxidizing agents, about the only one that has found any commercial application involves the use of manganese oxides. The Weldon and Weldon recovery processes used manganese dioxide or manganese sesquioxide alone or mixed with calcium oxide, such as CaO.2MnO₂; however, the yield of chlorine from hydrogen chloride amounted to only one-third to one-half of the total chlorine available. If the Weldon recovery process is used, about six-tenths of the available chlorine is wasted as calcium chloride in regenerating the manganese dioxide; otherwise, in order to obtain higher yields, manganous chloride has to be rejected. These processes have not been practical commercially because of the high cost of the oxidizing agents and low yields of the free halogen. The methods involving formation of metallic halides followed by oxidation of the halides formed, such as in the Weldon-Pechiney and Mond processes, involve intermittent operation, absorption and oxidation at different temperature levels, and liberation of the halogen mixed with the hydrogen halide or with the hydrogen halide and nitrogen, and even containing oxygen in some cases. These methods have not found much commercial application because of their complexity. Of the oxidation methods, the Deacon process has doubtless been used the most commercially because it is a continuous catalytic process using free oxygen or the oxygen contained in the air as the oxidizing agent and the per pass conversions are relatively high. This process suffers from the disadvantage, however, that the effluent contains water, unconverted hydrogen halide, oxygen, and nitrogen as well as the free halogen. Separation of the halogen and hydrogen halide from these other constituents is difficult and rather expensive if low-temperature fractionation or condensation methods are used. The electrolytic processes may be used to generate a free halogen from a hydrogen halide; however, in the petroleum industry the sources of cheap organic material such as natural gases, refinery gases, or other such material suitable for halogenation reactions on a larger scale are ordinarily not near sources of the very cheap electrical energy required for such electrolytic processes. Also, in the generation of free halogen by the electrolytic processes, part of the cost of the process is ordinarily absorbed by the production and sale of alkali. However, in the electrolysis of a hydrogen halide, hydrogen rather than alkali is the by-product obtained. This hydrogen is not a particularly valuable by-product since it may ordinarily be produced or recovered more cheaply in connection with cracking or dehydrogenation operations conducted at the refinery. Consequently, the entire cost of the electrical energy required, which is ordinarily not extremely low, must be assigned to the halogen produced, resulting in rather high cost of production.

An object of the present invention is to provide a process for the recovery and utilization of a hydrogen halide from dehydrohalogenation reactions.

A further object is to provide a process for the economical conversion of a hydrogen halide to a free halogen suitable for halogenating hydrocarbons, thereby avoiding expensive separation methods.

A principal object is the utilization of the Deacon process for producing a free halogen for halogenating hydrocarbons.

Another object is the provision of a cyclic process for the production of diolefins from the corresponding olefins.

A further object is to provide an efficient process for the manufacture of dichlorbutane from a hydrogen halide and butenes for production of butadiene.

Another object is to provide a process for the removal of an unreacted hydrogen halide and water from the Deacon process effluent rendering the remaining effluent suitable for a halogenation reaction.

An additional object is to provide a process for freeing a hydrogen halide from organic halides or hydrocarbon contaminants which would poison the Deacon catalyst due to tar or carbon formation.

Other objects and advantages of the invention will be apparent from the appended drawings and following description.

This invention, whereby a hydrogen halide is converted to a free halogen and the latter is utilized for effecting halogenation reactions, is comprised of the following steps: Organic halides and/or hydrocarbons are removed from the hydrogen halide feed stock to protect the Deacon catalyst from tar or carbon formation. This is accomplished by means of a combustion process which converts the organic halides or hydrocarbons to gaseous oxidation products without appreciably attacking the hydrogen halide present or by means of a selective absorption or adsorption process wherein the organic halide and/or hydrocarbons are removed from the hydrogen halide by absorption in a suitable scrubbing fluid of very low vapor pressure and/or adsorption on a suitable adsorbing agent such as charcoal, from either of which the absorbed or adsorbed organic halides and/or hydrocarbons can be recovered either intermittently or continuously as is most desirable. The hydrogen halide is oxidized preferably at elevated pressure over a Deacon-type catalyst to form free halogen and water. The water and unreacted hydrogen halide are scrubbed from the Deacon effluent with a constant-boiling aqueous hydrogen halide solution and the dry hydrogen halide recovered is recycled back to the Deacon reactor for further conversion, the regenerated constant-boiling mixture being recycled to effect further absorption. The halogen-nitrogen-oxygen-carbon dioxide mixture remaining is utilized directly for effecting halogenation reactions. The vapors of the organic halide products and unreacted hydrocarbons in the effluent from the halogenation reactor are recovered from the residual nitrogen-oxygen-carbon dioxide stream by sufficient fractionation to remove the halides and part of the hydrocarbons; the hydrocarbons remaining in the residual gas stream are scrubbed out with a suitable solvent of low vapor pressure such as a heavy scrubbing oil or by adsorption with a suitable adsorbent such as activated charcoal, the absorbed or adsorbed materials being recovered and used as may be desirable.

This invention is best described by reference to the flow diagrams, portrayed in the accompanying drawings wherein the essential operations of the process are shown. This process may be used for the conversion of all the hydrogen halides except hydrogen fluoride to free halogen and utilization of the halogens produced for effecting halogenation reactions. In the case of hydrogen fluoride, the reverse of the Deacon reaction is the most favored reaction. The process as described with reference to the drawings relates to the conversion of hydrogen chloride to chlorine and utilization of the chlorine produced; however, it is not limited to this application but may be applied with appropriate modifications, such as are hereinafter indicated, to the conversion of hydrogen bromide and iodide and to the utilization of the bromine and iodine produced therefrom.

The hydrogen chloride, which has been recovered from dehydrochlorination or substitutive chlorination processes or from any other source and which may or may not be contaminated with small amounts of organic chlorides or hydrocarbons, enters the reaction system through line 1 into drier 2 where it is freed of water by means of a suitable desiccant such as activated alumina. The dried gas is then compressed by means of compressor 3 to a pressure sufficiently high to permit the gas to flow through subsequent steps in the process, wherein elevated pressure is desirable, such as in the Deacon reaction, absorption of hydrogen chloride from the Deacon effluent, and in the chlorination step where the use of pressure is required to hold the hydrocarbons in the liquid phase at prevailing atmospheric temperatures. It is desirable to compress the hydrogen chloride at this point rather than subsequently because oxygen, chlorine, and water vapor are absent at this point, hence corrosion difficulties are reduced and a less-expensive corrosion-resistant compressor may be used. The compressed hydrogen chloride then flows through the cooler 4, line 5, and valve 6, valve 21 being closed, into oxidizer 7, wherein the organic chlorides and hydrocarbons are burned in order to prevent their subsequent decomposition upon the Deacon catalyst and its poisoning as a result of tar, carbon, or other decomposition products deposited thereon. In case this oxidation is carried out directly, use of the cooler 4 is not desirable since the gas has to be heated for the oxidation reaction; however, if the gas is first scrubbed through an absorbing or adsorbing agent for removal of the contaminants, either in conjunction with or as a substitute for the burning-out process, it is desirable to remove the heat of compression by means of cooler 4 before the gas passes to the scrubbing process since removal of the contaminants is more complete at the lower temperature obtained.

The air or oxygen required for the burning-out and Deacon processes, which is ordinarily air since it is cheaper than pure oxygen or an oxygen concentrate, enters through line 8 and drier 9, which contains a desiccant such as activated alumina or some other suitable material, into compressor 10 by means of which it is compressed to a pressure sufficiently high to permit it to flow through the subsequent steps of the process. The compressed air is freed of any traces of oil from the compressor by passing it through charcoal and then flows through preheater coil 11 of the furnace 12, which may be heated by the combustion of waste refinery or natural gases or in any other way desirable. This heating coil 11 may be made of stainless steel or any other alloy which is resistant to corrosion by air or oxygen. The air or oxygen is heated to a temperature sufficiently high to supply a large part of the heat requirements for carrying out the Deacon reaction and a large part of the heat required for the preliminary burning-out step. By supplying as large a part of the heat requirements for the reactions as possible with the heated air stream, more serious corrosion difficulties which may be encountered as a result of heating the hydrogen chloride or mixed hydrogen chloride-air streams are largely eliminated. The heated air flows through line 13 to the branch in the line whence part of it flows through line 14 and valve 15 into the oxidizer 7, but the major part of it flows through valve and line 20 into the Deacon reactor 19.

In the burning-out step carried out in oxidizer 7, the small amounts of the organic chloride and hydrocarbon present are burned catalytically with an appreciable excess of air or oxygen over that required to burn these materials completely to carbon dioxide, water, and chlorine, although some of the hydrogen and chlorine contained therein will result in the formation of hydrogen chloride, depending upon the equilibrium conditions. There is the possibility of forming some phosgene under the conditions of this reaction; however, it will be decomposed in the subsequent Deacon process or in the subsequent scrubbing step with constant-boiling hydrochloric acid solution, which will serve to decompose it by hydrolysis. This burning-out process may be carried out with the use of catalysts such as pumice or other suitable inert support material impregnated with copper chromite at a temperature in the range, 400 to 900° C., but preferably at 550° C. and with an appreciable excess of air or oxygen over that required for conversion of the contaminants present in the above products. Similarly, this burning-out process may be carried out with the use of surface-active materials such as alumina, pumice, broken porous porcelain, silica gel, or the like as catalysts in the above temperature range, although temperatures above the optimum temperature of 550° C. for the copper chromite catalyst are ordinarily required. Since this burning-out process occurs at a higher temperature level than that required for the Deacon process, the air flowing to oxidizer 7 must be given a supplemental preheat, the hydrogen chloride must be preheated, or the oxidizer 7 must be heated. Since the amount of air required is small in proportion to the total stream involved, it is desirable to preheat the hydrogen chloride in a suitable corrosion-resistant coil or vessel rather than preheat the air to the extremely high temperature required to supply a large part of the heat necessary and/or heat the oxidizer 7 wherein heat transfer is not good because of the corrosion-resistant liners and the porous catalyst contained therein. If the hydrogen chloride is sufficiently dry, the preheater coil or vessel required may be made of 18 per cent chromium-8 per cent nickel or other high chrome-nickel stainless steel or other corrosion-resistant alloy. If corrosion is severe because of traces of water vapor, oxygen, and/or free halogens, corrosion-resistant alloys, steel, or other metals suitably lined with high-temperature-resistant glass, suitable refractory material, tantalum, or the precious metals may be used for equipment such as oxidizer 7. Since use of the copper chromite catalyst permits the use of a lower reaction temperature in oxidizer 7 than is permissible with the use of surface-active catalysts alone, the problem of building a suitable corrosion-resistant reaction chamber for operation at elevated pressure is simplified. Steel or corrosion-resistant alloy equipment suitably lined with high-temperature-resistant glass or suitable refractories such as fused silica, alumina, silicon carbide, or the like, in such a way as to protect the metal or alloy surfaces from contact with the reaction products, may serve for the construction of this reactor.

Ordinarily, the hydrogen chloride stream has already previously been freed of the greater part of any organic chloride and/or hydrocarbon contaminants by means of suitable fractionation, scrubbing with organic halides or oil of very low vapor pressure, or by adsorption on a suitable adsorbent such as activated charcoal or the like or by a combination of these processes. In case the hydrogen chloride entering through line 1 is contaminated with large quantities of organic chlorides and/or hydrocarbons, these contaminants should be largely removed by one or more of the above processes before removal of any remaining small quantities of these contaminants by means of the above burning-out or scrubbing processes. The additional equipment required may be inserted in line 5 or at any other suitable point ahead of oxidizer 7. In those cases in which only inorganic or other contaminants are present which do not poison the Deacon catalyst, or if the organic halide or hydrocarbon contaminants can be sufficiently completely removed by a combination of the above fractionation and scrubbing processes so that there is no danger of poisoning the Deacon catalyst, it may be desirable to eliminate the burning-out step, in which case valves 6, 15, and 16 would be closed and valve 21 opened in order to by-pass the oxidizer 7.

Assuming that the burning-out step is used, the effluent from oxidizer 7 flows through valve 16 and drier 17, which is charged with activated alumina or other suitable desiccant, and finally through line 18 into the Deacon reactor 19. In this case, all of this equipment must be constructed of much the same materials as oxidizer 7 to satisfactorily resist corrosion by the effluent from this oxidizer. If the burning-out process is not used, oxidizer 7 may be by-passed as was indicated above, and the scrubbing equipment required for passing the hydrogen chloride through a liquid absorbent and solid adsorbent may be substituted for the drier 17.

In the Deacon reaction, free chlorine is produced from the hydrogen chloride by an oxidation reaction according to the following equation: $4HCl + O_2 \rightarrow 2Cl_2 + 2H_2O$. The temperature range in which this reaction occurs is quite wide, usually being within the range of about 200° C. to about 700° C. In this reaction, both chlorine and oxygen are competing for the hydrogen and at 577° C. both appear equally strong because the hydrogen is distributed equally between the chlorine and oxygen. At temperatures above 577° C., the formation of hydrogen chloride and oxygen is favored, whereas below this temperature, the formation of water and chlorine is favored, the more so the lower the temperature. However, the lower the temperature, the slower the reaction rate, so in order to secure satisfactory reaction per unit of time, a higher temperature is required than may be deduced from equilibrium conditions alone. Ordinarily, the optimum temperature is about 430° C. with the use of a suitable catalyst such as pumice or other suitable inert carrier impregnated with cuprous chloride or other suitable chlorides, such as those of iron, nickel, manganese, cerium, or the like. Ordinarily, the most favorable catalysts are those of elements which have several possible valencies and which are easily oxidized or reduced. Also, it is desirable that the chlorides used should not volatilize readily at the reaction temperature used, otherwise they will sublime out of the reaction vessel. It is frequently desirable to use one or more of the above chlorides in mixtures with sodium chloride, potassium chloride, or other chlorides in order to reduce the vapor pressure of the catalytically active chloride and thereby prevent sublimation of the catalyst. When the above reaction is carried out at atmospheric pressure with air as the oxidizing agent, the best yield is obtained with a mixture of 40 per cent hydrogen chloride and 60 per cent air which is reacted at about 430° C., in which case about 70 per cent of the hydrogen chloride can be oxidized to chlorine per pass through the reactor. By the use of pure oxygen or oxygen-nitrogen mixtures enriched in oxygen, higher conversions than this may be obtained; however, the cost of concentrating or separating pure oxygen from air or otherwise producing pure oxygen is ordinarily too great to be justified by the increased per pass yield of chlorine obtained. Since there is a diminution in volume in the above reaction as it proceeds from left to right and the reaction products are more readily condensable than the initial reactants, it is evident that the use of elevated pressure will produce a greater equilibrium conversion to chlorine than would have been obtained at atmospheric pressure. Pressures from atmospheric to whatever value may be required to hold the organic material to be chlorinated in the liquid phase may be used. Ordinarily these pressures are in the range of from atmospheric to several hundred pounds per square inch. It is also evident that the presence of excessive water vapor favors the reverse reaction, hence it is desirable to dry the reactants as completely as possible before carrying out this process. The above reaction as written is exothermic to the extent of 27.6 kilogram calories per four gram moles of initial hydrogen chloride; consequently, the reactants are heated to a temperature somewhat below that required for the optimum conversion and the above heat of reaction is utilized to heat the reactants and reaction products to the desired optimum temperature before they leave the reactor and also to compensate for any heat losses due to conduction, radiation, and the like.

Likewise, hydrogen bromide and hydrogen iodide may be oxidized under conditions similar to those indicated above to produce free bromine and iodine. The hydrogen bromide is oxidized more readily than hydrogen chloride and the hydrogen iodide more readily than the hydrogen bromide with progressively greater per pass conversions to free halogen and progressively diminishing optimum reaction temperature as one goes from hydrogen chloride to hydrogen iodide. It has been shown by Berthelot that a mixture of hydrogen iodide with one-fourth its volume of pure oxygen burns with a red flame. On the other hand, fluorine will react with water to form hydrogen fluoride and ozone even at low temperatures, and since the affinity of the halogen for hydrogen increases with increasing temperature, it does not appear that an oxidation process such as this is suitable for the production of free fluorine from hydrogen fluoride.

Corrosion-resistant construction similar to that described for oxidizer 7 may be used for the Deacon reactor 19. Reactor 19 is much larger than oxidizer 7; consequently, in order to build it to withstand elevated pressures at the elevated temperatures used without using an excessively thick wall, it is advantageous to pass part of the air required, but which is unheated, through the space between the shell wall and the inner refractory or corrosion-resistant liner and subsequently into the Deacon reaction space. This will serve to sweep out any highly corrosive reaction products from this space, thus preventing corrosion of the pressure-resistant shell, and it will also serve to cool the shell so that a thinner wall may be used and yet withstand the pressure, thereby reducing the amount of expensive corrosion-resistant alloy or metal required for construction of this reactor. The small amount of air required for this purpose may be by-passed from compressor 10 through a cooling coil, if desirable, directly to reactor 19 by means of a rate control valve and a small line which are not shown in the drawings.

The effluent from the Deacon reactor 19 is then passed through the cooler 22 and subsequently treated to free it of water vapor and recover a substantial amount of the unconverted hydrogen chloride in anhydrous condition to be recycled and reacted further for recovery of free chlorine to as great an extent as is possible. This drying of the effluent and separation of the hydrogen chloride therefrom may be effected by scrubbing the effluent with a constant boiling aqueous hydrogen chloride solution in absorber 23, into which the effluent is introduced through the line extending to it from cooler 22, passing upward through suitable packing wet with the aqueous hydrogen chloride solution, which is introduced from line 24 into the top of absorber 23, in which it flows downward countercurrent to the gas flow. The residue gases of the effluent consisting principally of nitrogen, free halogen, and smaller amounts of oxygen and carbon dioxide in practically anhydrous condition pass out of absorber 23 through line 25 to drier 26, which may be charged with activated alumina or other suitable desiccant for completely drying the gases, and finally through the one-way check valve 27 to the chlorinator 28, where it may be utilized for effecting the desired chlorination of the organic material by either additive or substitutive chlorination, as may be required. The check valve 27 is used to avoid any possibility of organic material backing up into the line containing free chlorine, which constitutes a serious explosion hazard.

The aqueous hydrogen chloride solution which has become more concentrated in hydrogen chloride by absorption of this gas in absorber 23 flows out of the absorber through line 29 into the flash drum 30, wherein it is heated by means of the heating coil 31 or in any other desirable way to regenerate the constant boiling aqueous hydrogen chloride solution and drive off the absorbed hydrogen chloride through line 32 into the drier 33, containing anhydrous alumina or other suitable desiccant for drying the hydrogen chloride before recycling it by means of pump 34 through lines 35 and 18 back to the Deacon reactor 19 where it is reacted further to convert it as completely as possible to free chlorine. This drying step is not absolutely necessary, but it eliminates the necessity for very special corrosion-resistant materials in pump 34 and the lines required beyond the drier 33. Also, by removal of all the water from the hydrogen chloride that is recycled, the equilibrium reaction for oxidation of the hydrogen chloride to free chlorine and water vapor is favored.

The constant boiling aqueous hydrogen chloride solution regenerated in the flash drum 30 leaves it through line 36 and a cooler 37 and flows into the storage reservoir 38, whence it flows through the line 39 into the circulating pump 41, which returns it through line 24 to the absorber 23 for reuse in the absorption process. Since water is constantly being generated in the Deacon reaction, the amount of constant boiling aqueous hydrogen chloride solution in this system increases constantly to the extent of the water formed and the amount of hydrogen chloride required to produce a constant boiling solution from it. The solution that is formed is drained from the system from time to time as may be required through valve and line 40. This may be dehydrated in any suitable way and the hydrogen chloride recovered returned to the system for retreatment in the Deacon process, or the chlorine may be regenerated from it in any other desirable way such as by electrolysis. However, since the amount of hydrogen chloride involved is rather small in comparison with the total amount treated, it is usually more economical to reject this acid and make up the chlorine deficiency produced by addition of fresh chlorine from other sources to the system. In the petroleum industry, the aqueous hydrogen chloride solution produced may be utilized advantageously in acidizing oil wells or put to other uses in refining or conversion processes.

The constant boiling aqueous hydrogen chloride solution which is used for removal of hydrogen chloride and water from the effluent from the Deacon process has a concentration of 10.5 molar per cent or 19.2 weight per cent hydrogen chloride and a boiling point of 109.7° C. at one atmosphere absolute pressure. The concentration of the hydrogen chloride solution may be increased to about 42 weight per cent hydrogen chloride at a temperature of about 23° C. and a partial pressure of hydrogen chloride of one atmosphere, depending upon the efficiency of the absorber. Concentrations above 42 weight per cent of hydrogen chloride may be attained if the absorption is carried out at lower temperatures, for which refrigeration is ordinarily required, or if the gases being scrubbed are compressed to a pressure sufficiently high that the partial pressure of the hydrogen chloride exceeds one atmosphere appreciably. The maximum concentration of acid that one may expect to attain may be determined from the partial pressure of hydrogen chloride in the gas mixture to be scrubbed, corrected for the water vapor present which is also removed as aqueous hydrogen chloride solution, and data for the partial vapor pressure of hydrogen chloride vapor over the aqueous solution as a function of its concentration and the temperature of the scrubbing operation. These data are available in tables such as the one in the "International Critical Tables," McGraw-Hill Book Company, New York (1928), vol. III, page 301. Upon reboiling the concentrated acid in the flash drum 30, practically anhydrous hydrogen chloride is evolved and the constant boiling hydrogen chloride solution recovered. Ordinarily, the regenerated solution will have a concentration in the range, 19 to 22 weight per cent of hydrogen chloride, depending upon how completely the absorbed hydrogen chloride is recovered from the solution. The hydrogen chloride may also be recovered from the concentrated solution by means of reduced pressure or by passing insoluble gas through the solution if it is found advantageous to do so.

Similarly, other available data regarding the boiling points and compositions of constant boiling aqueous hydrogen halide solutions and partial vapor pressures of hydrogen halide over aqueous hydrogen halide solutions as a function of their concentrations and the temperature may be utilized to determine the operating conditions required for separation of the other hydrogen halides and water from the Deacon effluent and recovery of the pure hydrogen halides for reuse in the process, and also of dehydrated halogen containing mixtures or practically pure halogens suitable for reuse in the halogenation reactions. Constant boiling aqueous hydrogen bromide solution boils at 126° C. at one atmosphere pressure and contains 47.9 per cent by weight of hydrogen bromide. Constant boiling aqueous hydrogen iodide solution boils at 127° C. at 774 mm. Hg pressure and contains 57.0 per cent by weight of hydrogen iodide. In separating bromine from hydrogen bromide and water by this procedure, the scrubbing process in absorber 23 may be carried out at a temperature above the boiling point of bromine, namely, 58.7° C., in which case the bromine and some of the vapors of the constant boiling hydrobromic acid solution will pass off through line 25. These vapors may be condensed and the bromine layer separated from the aqueous hydrobromic acid layer, the latter being returned to absorber 23 for reuse in the process and the bromine may be used for bromination reactions in any desired manner. This separation may be effected by physical separation, fractionation, or in any other desired manner. Alternatively, the Deacon effluent may be scrubbed at lower temperature, in which case a considerable amount of bromine will condense out in absorber 23. By inserting a trap in the line 29, the bromine layer may be allowed to separate from the aqueous hydrobromic layer and be drawn off from time to time as required and be used for carrying out the bromination reactions, although it may first require drying with a desiccant or other purification. In separating iodine from hydrogen iodide and water by this procedure, the iodine will largely condense in the cooler 22 and the remainder in absorber 23 because of its high boiling point, namely 184.4° C. In this case, the cooler 22 may be provided with scrapers to remove the solid iodine continuously or it may be heated intermittently to or continuously maintained at a temperature above the melting point of iodine, 112 to 115° C., but below the boiling point, 184.4° C., so that the iodine will drain off into a suitable receiver. Also, a separator should be inserted in line 29 so that solid iodine particles which settle out can be recovered and reused. From time to time it is desirable to heat up absorber 23 above the melting point of iodine so that it will be melted and run down into the separator, where it may be removed for use. The iodine recovered may be dried or given whatever purification may be required for reuse in conducting iodination reactions. As was indicated above, fluorine cannot be regenerated or recovered by this process because of the fact that it reacts with water to generate hydrogen fluoride and ozone, although hydrogen fluoride can be recovered.

The equipment indicated by the numbers 22 through 26 and 29 through 41, as well as the line leading from the Deacon reactor 19 to the cooler 22, requires special corrosion-resistant construction to withstand attack by the aqueous hydrogen halide solutions and free halogen and oxygen present. If the steps involved are carried out under elevated pressure as was indicated above, this equipment may be constructed of corrosion-resistant alloys, steel, suitably lined with glass, silica, alumina, or other refractory material, also tantalum, the precious metals, or other suitable corrosion-resistant metals. In those cases in which these steps are not carried out at elevated pressure, this equipment may be constructed of stoneware; refractories such as glazed fused alumina, fused silica, silicon carbide, or the like; carbon or graphite; glass; or similar materials.

The halogenation reaction may be effected in the reactor 28 in any desired way by either additive or substitutive halogenation either in the liquid or gas phase to produce the desired halogenation product. In this particular case, the application of this invention is primarily concerned with the additive chlorination of secondary olefins in the presence of alkanes and tertiary monochlorides and specifically with the treatment of a refinery stream containing four carbon hydrocarbons and the tertiary monochlor derivative thereof. The carefully dried feed stream containing normal and isobutane, isobutyl chloride, butene-1, butene-2, and small amounts of hydrogen chloride enters the system through line 42, preferably as liquid, and passes into pump 43 which compresses it or introduces it under pressure through the one-way check valve 44 into the chlorinator 28 under sufficient pressure so that the feed remains in the liquid phase in the chlorinator in the presence of the gas stream containing chlorine, nitrogen, carbon dioxide, and oxygen which was introduced through check valve and line 27. The check valve 44 serves to prevent chlorine or a chlorine-rich mixture from backing up into the hydrocarbon feed line under any circumstances, which would present a considerable explosion hazard. This chlorination is best carried out with vigorous stirring or agitation in order to prevent excessive local concentrations of chlorine, which would constitute an explosion hazard. The chlorine should be added in molar quantity equal to that of the combined butene-1 and butene-2 present, use of excess chlorine being avoided to prevent wastage of this relatively expensive constituent. Mild chlorination catalysts such as sulfuryl chloride may be used to speed up the reaction, although additive chlorination of the secondary olefins will proceed satisfactorily without the use of a catalyst. Cooling of the chlorinator, as indicated by the cooler 45, must be used to prevent the heat of the chlorination reaction from causing a progressive rise in temperature, which may result in flashing or explosions. The temperature of the chlorinator should be kept as low as is economically feasible. If there is waste refrigeration available, it should be used for this purpose; otherwise, water cooling may be used, but this involves the use of higher pressure to maintain the hydrocarbons in the liquid phase. The chlorinator 28 may consist of one or a series of chlorinators designed to operate continuously, or it may consist of a group of batch chlorinators operated in rotation to secure continuous output. In any event, the chlorination process should be carried out so that the olefins and chlorine, particularly the latter, are converted as completely as possible to the dichlorides in order to avoid waste in the process.

The effluent from the chlorinator 28 then flows into fractionator 46 which is designed to separate the nitrogen, oxygen, carbon dioxide, traces of hydrogen chloride and chlorine, and much of the butanes from the chlorinated products. The former lower boiling constituents pass out of fractionator 46 through line 47 into cooler 48, wherein these vapors are cooled by means of water cooling or refrigeration sufficiently so that the temperature is reduced below the dew point of the butanes at their partial pressure, causing liquid butanes to separate out and collect in the reflux storage reservoir 49, from which a sufficient amount of the liquid to serve as reflux is returned by means of the pump 50 or by gravity flow to the fractionator 46 in order to ensure complete separation of the chlorinated derivatives from the more volatile hydrocarbons and normally gaseous constituents, which latter pass from the reflux storage reservoir 49 through line 51 to other equipment in which the butanes and other hydrocarbons present are recovered from the gaseous diluents. The chlorinated butanes and any remaining hydrocarbons leave fractionator 46 and flow to pump 52 which forces them through the peroxide remover 53, wherein any organic peroxides which may have been formed in the chlorination step in the presence of oxygen are decomposed so that they will not concentrate in any part of the fractionation equipment, thus avoiding any possible explosion hazard from this source. The peroxide remover 53 may be charged with ferrous, cuprous, or other easily oxidized salts, preferably the chlorides in this case, and be heated to temperatures in the range, 100 to 300° C. These salts serve to decompose the peroxides and are themselves oxidized. These salts may be replaced from time to time or be reduced to their initial state as required. Any water formed by decomposition of the peroxides is then removed by means of drier 54 which is charged with activated alumina or any other suitable desiccant. This stream then flows into fractionator 55 which represents all the fractionation equipment and steps necessary to separate the remaining butanes from the chlorinated derivatives and separate the individual chlorinated butane constituents or any desired fractions of these constituents. The butanes leave fractionator 55 through valve and line 56 and flow back through lines 57 and 58 to the refinery for further processing. Valve and line 59 may be considered to be any one of several take-off lines from fractionator 55 for withdrawal of chlorinated constituents or any desired fractions thereof.

The gaseous mixture consisting of nitrogen, oxygen, carbon dioxide, butane, and traces of hydrogen chloride and chlorine, which passed from the fractionation equipment through line 51, passes next through the alkali scrubber 60, wherein the gases are scrubbed with either solid alkalies or suitable inorganic oxides or even aqueous alkaline solutions to remove the traces of hydrogen chloride, chlorine, and carbon dioxide present. The residual gas stream then flows through the line and valve 61 into the absorber 62, wherein it passes upward through the suitably packed tower countercurrent to suitable scrubbing oil of very low vapor pressure which flows into the absorber through line 63 downward through the packed tower and finally, after being saturated as completely as possible with butanes and any other hydrocarbons present, it flows out the bottom of the absorber into pump 65 which forces it through line 66 into the stripper 67. The residual nitrogen-oxygen stream leaves absorber 62 through valve and line 64 and may be either rejected or utilized in any way that is desirable. The oil, which is saturated with butanes and which enters stripper 67 through line 66, is freed of the dissolved butanes and any other volatile hydrocarbons present by heating or, in this particular case, by passing steam through line and valve 68 into the stripper 67 and up through the oil, leaving it together with the hydrocarbons removed through line 69 into cooler 70, wherein the steam is condensed to water. The water, any scrubber oil which distills over, and butane and other hydrocarbon gases liberated flow into separator 71, from which the water is withdrawn through valve and line 72 as required and returned to the boiler to produce more steam. The scrubber oil which distills over into this separator in small amounts may be collected from time to time and returned to reservoir 79 of the oil scrubbing system. The butanes and other volatile hydrocarbons separated in separator 71 flow out through line 73 into drier 74, which may be charged with activated alumina or any other suitable desiccant, and finally through valve 75 and lines 76 and 58 back to the refinery for further processing. The scrubbing oil, which has been stripped free of the dissolved butanes and other volatile hydrocarbons leaves stripper 67 through line 77 and flows through cooler 78 into the storage reservoir 79, whence it flows through line 80 into pump 81, which forces it back through line 63 into absorber 64, where it again serves to extract the butanes and volatile hydrocarbons from the gas mixture passing through the absorber.

The following example will serve to illustrate further the nature and application of this invention, which, however, is not limited to the regeneration of chlorine and chlorination of four carbon hydrocarbons but may be applied for the regeneration of any of the halogens enumerated above and the use of these halogens for effecting any desired halogenation reactions of organic compounds or halogenated or other derivatives thereof.

*Example I*

A stream of dry hydrogen chloride containing about 0.9 mole per cent butane dichlorides and about 0.2 mole per cent isobutyl chloride is treated by either the catalytic oxidation or scrubbing processes previously described for the equipment indicated by the numbers 1 through 17 in Figure 1, leaving a residue of 9,184 pounds per hour of dry hydrogen chloride to be combined with 1,720 pounds per hour of dry hydrogen chloride which was recovered and recycled through lines 35 and 18, making a total of 10,904 pounds per hour of dry hydrogen chloride to be burned in Deacon reactor 19. For this combustion process, 162,340 cubic feet (at 0° C. and one atmosphere absolute pressure) per hour of air are required. The Deacon reaction is carried out at a temperature 430° C. and a pressure of 150 pounds per square inch absolute. The composition of the Deacon effluent, amounting to 23,885 pounds per hour, expressed in molar percentages, is as follows: hydrogen chloride, 8.9; oxygen, 5.0; nitrogen, 51.5; water, 17.3; and chlorine 17.3. By means of the process used for scrubbing this effluent with constant boiling aqueous hydrogen chloride solution and freeing the solution of excess hydrogen chloride about 1,720 pounds per hour of anhydrous hydrogen chloride are recovered and recycled to the Deacon reactor as was indicated above. There is also a production of about 2,649 pounds per hour of constant boiling hydrochloric acid solution, which is about 10.5 mole per cent hydrogen chloride, which solution is drained from the system through valve and line 40. The gas mixture leaving drier 26, amounting to 19,500 pounds per hour, has the following composition, expressed in mole percentages: oxygen, 6.8; and chlorine, 23.4. This is supplemented with 495 pounds of chlorine per hour to make up for the chlorine lost from the system as constant boiling hydrochloric acid solution.

The organic feed stock, amounting to 84,432 pounds per hour, has the following composition, expressed in mole percentages: propylene, 0.5; propane, 6.0; isobutane, 21.0; isobutyl chloride, 0.5; butene-1, 0.8; butene-2, 7.2; and normal butane 64.0. This stream is treated with the above chlorine-containing stream under a total pressure of about 150 pounds per square inch absolute, with constant agitation and the removal of the heat of chlorination, amounting to about 8,827,000 B. t. u. per hour by means of water cooling or otherwise in order to keep the temperature of the reaction down to 45° C. or below and maintain the hydrocarbons in the liquid phase. In this way, the olefins are substantially completely chlorinated to the dichlorides without any appreciable substitutive chlorination of the saturated hydrocarbons and isobutyl chloride present.

The above stream after chlorination is passed into fractionator 46, which is operated at a total pressure of 150 pounds per square inch absolute. The gases passing overhead from this fractionator are cooled in cooler 48 to 43° C. or below; i. e., below the dew point of the four carbon hydrocarbons present, to give some liquid hydrocarbons to be returned to fractionator 46 as reflux in order to prevent any chlorinated hydrocarbons from coming off from the top of this column. The stream coming off from fractionator 46 through line 51, amounting to 44,968 pounds per hour, has the following composition, expressed in mole percentages: nitrogen, 35.7; oxygen, 3.5; propane, 8.9; isobutane, 31.1; and normal butane, 20.8. This stream passes into absorber 62 from which the overhead effluent, amounting to 11,068 pounds per hour, has the following composition, expressed in mole percentages: oxygen, 8.9 and nitrogen, 91.1. The hydrocarbons removed from stripper 67 and passing out of separator 71, amounting to 33,900 pounds per hour, have the following composition, expressed in mole percentages: propane, 14.6; isobutane, 51.2; and normal butane, 34.2. These hydrocarbons are returned to the refinery for further processing through line 73, drier 74, valve 75, and lines 76 and 58.

The liquid passing into fractionator 55, amounting to 59,459 pounds per hour, has the following composition, expressed in mole percentages: normal butane, 84.8; isobutyl chloride, 0.8; propylene dichloride, 0.8; 2,3 dichlorbutane, 12.2; and 1,2 dichlorbutane, 1.4. In fractionator 55, the normal butane, amounting to 42,920 pounds per hour, is separated and returned to the refinery for further processing through valve 56 and lines 57 and 58. The chlorinated derivatives are separated by whatever fractionation steps are required as indicated by fractionator 55. In this way, the following quantities of chlorinated derivatives are recovered, expressed in terms of pounds per hour: isobutyl chloride, 680; propylene dichloride, 839; 2,3 dichlorbutane, 13,520; and 1,2 dichlorbutane, 1,500; or a mixture of these dichlorbutanes, 15,020 total. In this particular application, the dichlorbutanes are dehydrochlorinated to produce butadiene. The propylene dichloride and isobutyl chloride may also be dehydrochlorinated and used for production of polymerization products or chemical derivatives. The hydrogen chloride recovered from these dehydrochlorination processes is then returned to the regeneration and utilization process described above. The losses of hydrogen chloride involved, which are mainly as the constant boiling hydrochloric acid solution, are compensated for by addition of fresh chlorine or hydrogen chloride, from some other source.

The application of the process of this invention permits the economical recovery of a considerable percentage of waste hydrogen chloride as free chlorine and the utilization of this chlorine for effecting chlorination reactions. It permits the recovery of a large part of the hydrogen chloride from the Deacon effluent and its reuse in the process, and also dehydration of this effluent simultaneously by means of a simple scrubbing operation, and use of the residual nitrogen-chlorine-oxygen-carbon dioxide mixture for effecting chlorination reactions, eliminating more complicated dehydration steps and separation of the hydrogen chloride and chlorine by relatively expensive low temperature fractionation methods. Also, by the application of elevated pressure, the per pass conversion of the hydrogen chloride to free chlorine is improved, the efficiency of the scrubbing operation for removal of hydrogen chloride from this effluent is improved because the partial pressure of this constituent is increased, and it permits maintenance of the four carbon hydrocarbons in the liquid phase at ordinary atmospheric temperatures both in the chlorination step and the subsequent fractionation step. Since the four carbon hydrocarbons and their chlorination products can be maintained in the liquid phase in this way, it permits ready separation of these constituents from the nitrogen-oxygen-carbon dioxide stream by means of a simple fractionation and scrubbing step without the use of relatively expensive low temperature fractionation to effect this separation.

This invention is not limited to the regeneration of chlorine from hydrogen chloride and its utilization, but may be applied to regenerate free halogens with a high degree of conversion from any of the hydrogen halides with the exception of fluorine. The free halogens liberated may be utilized in the presence of the gaseous diluents remaining after scrubbing out the water vapor and unconverted hydrogen halide to effect any halogenation reaction desired either by additive or substitutive halogenation, provided that the small amount of oxygen present is not seriously detrimental to the halogenation reaction. This invention is not restricted to the halogenation of organic compounds but may also be applied to the halogenation of inorganic compounds or organic-inorganic derivatives as well. The process of scrubbing with constant boiling aqueous hydrogen halide solution may be utilized to separate anhydrous hydrogen fluoride from mixtures with oxygen, nitrogen, carbon dioxide, water vapor, and/or other inorganic or organic gases for regeneration of fluorine therefrom by electrolysis or otherwise, even though the Deacon process is not applicable to the regeneration of free fluorine from hydrogen fluoride. Similarly, the process of recovering pure anhydrous hydrogen halides by scrubbing with constant boiling aqueous hydrogen halide solutions and recovery of the anhydrous hydrogen halide therefrom may be applied to the separation of hydrogen halide from mixtures other than those specifically mentioned herein. Also, in those cases in which hydrogen fluoride is present in small concentrations in mixtures with the other hydrogen halides, it permits the concentration and recovery of hydrogen fluoride since this compound does not burn in the Deacon reactor and hence becomes more concentrated in the hydrogen halide stream recycled through line 32 back to the Deacon reactor 19. Since anhydrous hydrogen fluoride has a boiling point of +19.4° C., whereas other hydrogen halides boil at temperatures below −35° C., it is possible to separate this constituent easily by fractionation, as in a small fractionation column inserted in line 32. This invention should not be restricted except as specified in the appended claims.

I claim:
1. The process of converting to a free halogen a hydrogen halide other than hydrogen fluoride that is present in a mixture containing in addition to said hydrogen halide substantial amounts of organic contaminants in the form of organic halides and hydrocarbons, which comprises subjecting said mixture in substantially anhydrous form to combustive oxidation with heated substantially dry air in the presence of a solid surface-active combustion catalyst under conditions suitable for oxidizing said organic contaminants to gaseous oxidation products without substantially attacking the hydrogen halide present, drying the effluent from said combustion, and charging the dried effluent to a Deacon reactor and therein oxidizing the hydrogen halide with free oxygen to a free halogen and water by means of a Deacon-type catalyst.

2. The process of converting to free chlorine hydrogen chloride that is present in a mixture containing substantial amounts of organic contaminants in the form of organic chlorides and hydrocarbons, which comprises subjecting said mixture in substantially anhydrous form to combustive oxidation with heated substantially dry air in the presence of a solid surface-active combustion catalyst under conditions suitable for oxidizing said organic contaminants to gaseous oxidation products without substantially attacking the hydrogen chloride present, drying the effluent from said combustion and charging the dried effluent to a Deacon reactor and therein oxidizing the hydrogen chloride with free oxygen to free chlorine and water by means of a Deacon-type catalyst.

3. The process of converting to a free halogen a hydrogen halide other than hydrogen fluoride that is present in a mixture containing in addition to said hydrogen halide substantial amounts of organic contaminants in the form of organic halides and hydrocarbons, which comprises subjecting said mixture in substantially anhydrous form to catalytic combustion with heated dry air by means of a copper chromite catalyst and thereby oxidizing said organic contaminants to gaseous oxidation products without substantially attacking the hydrogen halide present, drying the effluent from said combustion, charging the dried effluent to a Deacon reactor and therein oxidizing the hydrogen halide with free oxygen to a free halogen and water by means of a Deacon-type catalyst, drying the Deacon effluent and removing the unconverted hydrogen halide therefrom by scrubbing said Deacon effluent with a constant-boiling aqueous solution of the hydrogen halide and thereby forming a gaseous effluent essentially free from water and from the hydrogen halide, which is suitable for direct use in halogenating hydrocarbons, and an aqueous hydrogen halide liquid effluent containing the hydrogen halide in excess of the constant-boiling proportion, distilling said liquid effluent to drive off the hydrogen halide contained therein in excess of the constant-boiling proportion and to regenerate the constant-boiling aqueous hydrogen halide solution, drying the hydrogen halide so driven off and passing it to the Deacon reactor, and employing said regenerated constant-boiling aqueous hydrogen halide in said scrubbing step.

4. The process of converting to a free halogen a hydrogen halide other than hydrogen fluoride that is present in a mixture containing in addition to said hydrogen halide substantial amounts of organic contaminants in the form of organic halides and hydrocarbons, which comprises subjecting said mixture in substantially anhydrous form to combustion with dry air in the presence of a solid surface-active combustion catalyst at a temperature of from 400 to 900° C. and thereby oxidizing said organic contaminants completely to carbon dioxide, water and halogen without substantially attacking the hydrogen halide present; drying the effluent from said combustion; charging the dried effluent to a Deacon reactor and therein oxidizing the hydrogen halide with air to free halogen and water by means of a Deacon-type catalyst; removing the water and unconverted hydrogen halide from the Deacon effluent by scrubbing the same with a constant-boiling solution of the hydrogen halide and thereby forming a gaseous effluent essentially free from water and from the hydrogen halide and consisting principally of nitrogen, the free halogen and smaller amounts of oxygen and carbon dioxide, and an aqueous hydrogen halide liquid effluent containing the hydrogen halide in excess of the constant-boiling proportion; distilling said liquid effluent to drive off the hydrogen halide contained therein in excess of the constant-boiling proportion and to regenerate the constant-boiling aqueous hydrogen halide solution, drying the hydrogen halide so driven off and passing it to the Deacon reactor; and employing said regenerated constant-boiling aqueous hydrogen halide in said scrubbing step.

5. The process as defined in claim 3 wherein said hydrogen halide is hydrogen chloride and said halogen is chlorine.

6. The process as defined in claim 4 wherein said hydrogen halide is hydrogen chloride and said halogen is chlorine.

7. The process of converting to a free halogen a hydrogen halide other than hydrogen fluoride that is present in a mixture containing in addition to said hydrogen halide substantial amounts of organic contaminants in the form of organic halides and hydrocarbons, which comprises subjecting said mixture in substantially anhydrous form to catalytic combustion with substantially dry air by means of a copper chromite catalyst under conditions such that said organic contaminants are oxidized to gaseous oxidation products without substantially attacking the hydrogen halide present, drying the effluent from said combustion, and charging the dried effluent to a Deacon reactor and therein oxidizing the hydrogen halide with free oxygen to a free halogen and water by means of a Deacon-type catalyst.

8. The process of converting to a free halogen a hydrogen halide other than hydrogen fluoride that is present in a mixture containing in addition to said hydrogen halide substantial amounts of organic contaminants in the form of organic halides and hydrocarbons, which comprises subjecting said mixture in substantially anhydrous form to catalytic combustion with dry air by means of a solid surface-active oxidation catalyst at a temperature within the range of 400 to 900° C. such that said organic contaminants are oxidized to gaseous oxidation products without substantially attacking the hydrogen halide present, drying the effluent from said combustion, and charging the dried effluent to a Deacon reactor and therein oxidizing the hydrogen halide to a free halogen and water by means of a Deacon-type catalyst.

9. The process as defined in claim 7 wherein said hydrogen halide is hydrogen chloride and said halogen is chlorine.

10. The process as defined in claim 8 wherein said hydrogen halide is hydrogen chloride and said halogen is chlorine.

DONALD R. BLUMER.